Nov. 3, 1931. P. NACHTSHEIM 1,830,710

VALVE

Filed Sept. 23, 1929

Inventor

Peter Nachtsheim

By Linton, Kellogg Smith

Attorneys

Patented Nov. 3, 1931

1,830,710

UNITED STATES PATENT OFFICE

PETER NACHTSHEIM, OF SELLERS, LOUISIANA

VALVE

Application filed September 23, 1929. Serial No. 394,710.

This invention relates to improvements in valve constructions, having for an object to provide a novel form of rotatable valve, especially advantageous for use in controlling the passage of fluids through high pressure conduits, such for example, as those pipe lines employed in petroleum refining apparatus, the valve being so constructed that it may be quickly and effectually adjusted to be rendered absolutely and controllably fluid tight and hence, the seepage or leakage of inflammable gases or liquids therefrom detected, controlled and prevented.

It is also among the principal desiderata of the invention to provide a valve of the character mentioned, the component parts of which are few and of such construction and arrangement as will permit the same to be effectually assembled and disassembled in a minimum of time; furthermore, are of rugged and durable construction, thereby causing economy in manufacturing and prolonging the period of efficient usage of the same.

Yet another and equally important object of the invention is to provide a valve with telltale means adapted to function, with the closing of the valve, to give positive indication of any leakage of gas or liquid thereby, in order that adjustment may be made of certain active parts to render the construction controllably and visibly tight.

A further object of the invention resides in the provision of a valve which, in event of sticking of the plug or valve proper, as from a long period of disuse, may be, with but slight adjustment, released to allow of its free operation and then, as quickly, tightened to ensure fluid tightness of the same.

Other objects of the invention will be in part obvious and in part pointed out hereinafter.

In order that the invention and its mode of operation may be readily understood by persons skilled in the art to which this invention pertains, I have in the accompanying illustrative drawings and in the detailed following description based thereon, set out several embodiments of the same, with the understanding that such changes may be made as are within the scope of my appended claims.

In these drawings:—

Figure 1:
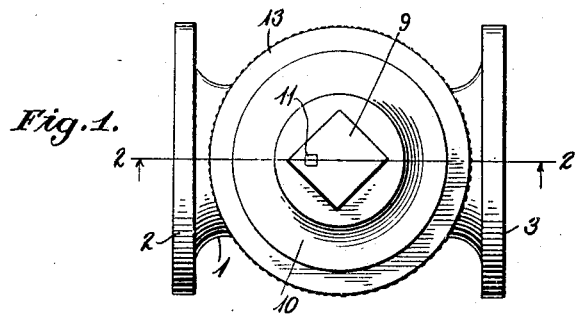
Figure 2:
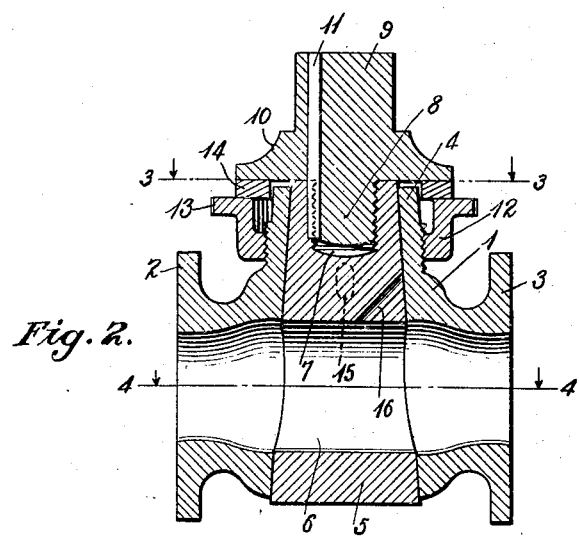
Figure 3:
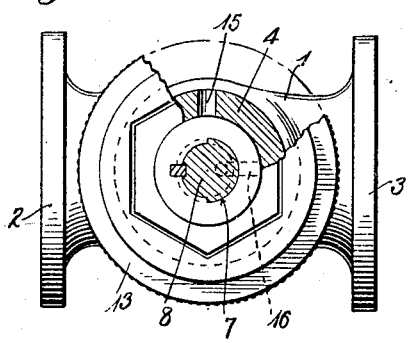
Figure 4:
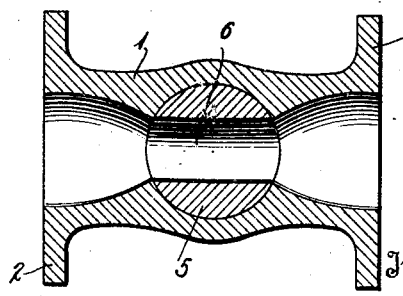

Figure 1 is a top plan view of the improved valve construction,

Figure 2 is a vertical longitudinal section through the same taken on the line 2—2 of the Figure 1, Figure 3 is a horizontal section taken on the line 3—3 of Figure 2, and having a portion thereof broken away to illustrate the leakage telltale arrangement Figure 4 is a similar section taken on the line 4—4 of Figure 2.

Having more particular reference to the drawings, in connection with which like characters of reference will designate corresponding parts throughout, the improved construction comprises a casing indicated in its entirety by the numeral 1, said casing being formed with flanged inlet and outlet extremities 2 and 3 having ports or ways therein, as is well shown in the Figures 2 and 4; the inlet and outlet extremities may be screwed as well as flanged, the intermediate portion of the casing being formed with a diametrically disposed tapered and cross sectionally circular valve seat and the reduced extremity of said tapered valve seat being provided with an outwardly tapered partially externally screw threaded tapered collar 4, the inner walls or surface of this tapered collar 4 being contiguous with the tapered inner surfaces or walls of the valve seat.

A cross sectionally circular and tapered plug valve designated by the numeral 5, is adapted to be snugly and rotatably received in the valve casing seat, aforesaid, said valve being provided with a way or port 6 for an obvious purpose. The plug valve 5 is of a length slightly greater than the combined diameter of the casing 1 and the length of the tapered collar 4, hence, with seating of the same in the valve casing seat, allowing one extremity of said plug to be arranged in proximity to the outer extremity of the collar 4, as is shown in the Figure 2. This particular or reduced end of the cross sectionally circular rotatable plug valve 5 is formed with a coaxially disposed screw threaded pocket or opening 7 which is adapted to receive therein the screw threaded reduced extension 8 of a spindle shank 9 therein, the outer extremity of said shank being multi-sided, as is shown in the Figure 1, whereby to permit of the fixed engagement of a valve handle, operating wheel or tool therewith (not shown herein). Also, the spindle shank 9 is formed with an intermediately arranged circular flange 10, the inner side of which is formed plane, for a purpose which will be presently described.

With turning of the screw threaded extension 8 into the screw threaded pocket 7 of the reduced end of the tapered plug valve 5, it will be seen that an operative connection will be effected between these two elements. To avoid relative rotary movement therebetween, I introduce a key 11 through a longitudinally disposed opening formed in the shank 9, engaging the inner portion of said key in alined key-ways formed in portions of the outer periphery of the extension 8 and the inner periphery of the screw threaded pocket 7.

With a view toward providing means for tightly engaging the peripheral surfaces of the tapered plug valve 5 with the tapered walls of the valve seat in the casing 1, a locking or adjusting nut 12 is provided, the screw threaded portion of this nut being adapted to be turned into engagement with the screw threaded portion of the outwardly tapered collar 4 and the outer portion of said nut being flanged as indicated by the numeral 13. A washer, of suitable material, indicated by the numeral 14, is adapted to be interposed between the flanged portion 13 of the adjusting nut 12 and the flanged portion 10 of the spindle shank 9, as is shown in the Figure 2, so that with outward rotation of said adjusting nut 12 over the screw threaded portion of the outwardly tapered collar 4, the flange portion 13 of said nut will be brought into engagement with the interposed washer 14 and by consequence, will impart an outward or longitudinal thrust to said spindle shank 9, which, because of its connection with the reduced end of the tapered plug valve 5, will cause said valve to move in a direction whereby the same will tightly and positively engage in the tapered seat provided therefor in the valve casing 1. Also, it will be understood that by reason of the interpositioning of the washer 14 between the adjacent surfaces of the flanged portions 10 and 13, a positive guard against any change of adjustment between the spindle shank 9 and the adjusting nut 12, due to rotation of the former over the latter, will be afforded. The corners of 4 at contact with 14 will allow sufficient clearance to pass 12 over it freely.

It is desirable, in valve constructions of the character disclosed herein, to provide the same with a telltale means, so that in event of leakage of gases or liquid by the valve, when the same is in closed position, a positive indicating or signalling means will be had, hence, enabling an operator to determine the faulty condition and to immediately take corrective steps. With this in view, I form in one side wall of the valve casing 1, adjacent the tapered seat provided therein, an elongated way or port 15. In the correspondingly positioned portion of the plug valve 5, I form a diagonally disposed by-pass or duct 16, one end of which opens into the valve port 6 and the other end of which opens onto one side of the tapered peripheral portion of the valve 5. Thus, with rotation of the plug valve 5 to its closed position, that end of the duct 16 opening onto the peripheral surface of the tapered valve 5 will be brought into registration with the port or way 15. Therefore, in event that the tapered peripheral surfaces of the plug valve 5 are not gas or fluid tight or properly seating upon the correspondingly formed surfaces of the valve seat in the casing 1, a portion of the gas or liquid leaking by the plug valve will be by-passed or shunted through the duct 16 and outwardly through the port or way 15 into the atmosphere, hence, giving a positive indication or signal to an operator or attendant, of the faulty condition of the valve and hence, notifying him of the immediate need for corrective adjustment of the valve parts.

In assembling my improved valve construction, the tapered rotatable plug valve 5 is inserted in the seat provided therefor in the casing 1, whereupon the locking or adjusting nut 12 is turned into engagement with the screw threaded portion of the outwardly tapered collar 4 after which the bearing washer 14 is placed upon the flanged portion 13 of the nut 12 and the screw threaded extension 8 of the spindle shank 9 is then turned, to the desired extent into engagement with the screw threaded pocket 7 formed in the adjacent and reduced end portion of said plug valve 5, thereby effecting an operative connection between the two, which connection is adapted to be locked against any further adjustment through the passing of the locking key 11 into engagement with the now alined ways formed in said pocket 7 and extension 8, in the manner shown in the Figure 2. A tool, handle or valve operating wheel (not shown herein) may now be engaged with the multi-sided portion of the shank. To effect tight or positive seating of the tapered rotatable plug valve 5 in the seat provided therefor in the casing 1, the adjusting nut 12 is now turned in a direction to move the same outwardly with respect to the collar 4, hence, imparting an outward thrust through the bearing washer 14 and the flanged portion 10 to the spindle shank 9, and thus, causing the tapered plug valve 5 to be positively moved into fluid or gas tight engagement with the correspondingly formed side walls of its receiving seat in the casing 1.

From the above, it will be readily understood by workers skilled in this particular art, that even though the number of working parts of my improved valve construction are few, they are exceedingly durable and simple, therefore, the invention will effectually withstand that rugged use to which the same may be put for a prolonged period of time, automatically and visibly indicating any disturbance of proper functioning of same at all times.

Should the original engagement of the plug valve 5 in the valve seat become non-fluid tight, as through wearing of the contacting parts, it is to be understood that this may be readily compensated for by further adjustment of the adjusting nut 12, that is, turning said adjusting nut in a direction to impart a further outward thrust to the spindle shank 9 through the bearing washer 14 and the flanged portion 10, hence, tightly engaging the tapered peripheral surface of the plug valve with the correspondingly formed surface or walls of the valve casing seat and again rendering the construction fluid or gas tight.

Furthermore, because of the formation of the plug valve 5 and its mode of engagement in the tapered seat provided therefor in the casing 1, it will be seen that said plug valve may be materially adjusted or re-tightened in its receiving seat in the casing 1 and consequently upon this, the period of time for which the device may be effectually and economically used, is materially lengthened. Also, by elongating the port or way 15 formed in the casing 1, it will be understood that the longitudinal adjustment of the plug valve 5 in the casing seat, as conditions warrant, will not affect the establishing of communication between the peripherally opening portion of the duct 16 and the valve port or way 6. That is to say, by reason of the elongated shape of said port 15, allowance is made for variation in the positioning of the outer extremity of the duct, due to various taking-up operation of the plug valve 5 through the adjusting nut 12.

While I have hereinbefore referred to my improved valve construction as being especially advantageous for use in connection with high pressure conduits, such as the pipe lines of apparatus for refining petroleum, it will be understood that the invention is not limited in its range of adaptation, but to the contrary, that the same may be used in connection with practically any form of conduit or pipe used for conducting fluids, vapors or gases, controllable as to losses regarding valve leakages and otherwise.

Manifestly, the construction shown is capable of considerable modification, and such modification as is within the spirit of my claims I consider within the spirit of my invention, one such being that flange 13 of nut 12 may be shaped to receive a handle, operating wheel, or other means of operation.

I claim:—

1. In a valve, a casing having inlet and outlet ways and a valve seat therein, a plug valve rotatably engaged in said seat, a portion of said casing having an elongated way formed therein and communicating with the seat, said plug valve having a by-pass formed in the same, one end of the by-pass communicating with the valve port and the other end opening onto the peripheral surface of the plug valve and adapted, at times, to register with said elongated way in the casing, and means adjustably engaged with said casing for imparting movement to the plug valve whereby to closely engage it in said seat.

2. In a valve, a casing having inlet and outlet ways and a cross sectionally circular tapered valve seat therein, a tapered plug valve rotatably engaged in said seat, the reduced end of said plug valve having a coaxially disposed screw threaded opening formed therein, a spindle shank formed with an intermediate flanged portion and with the reduced screw threaded extension, said screw threaded extension being adapted to be engaged in the coaxial screw threaded opening in said plug valve, an adjusting nut having screw threaded engagement with a portion of said casing in proximity to the reduced end of said tapered plug valve, said adjusting nut being adapted to impart a thrust to the flanged portion of said spindle shank, a bearing washer interposed between said spindle shank flange and said adjusting nut, a portion of said valve casing having an elongated way formed therein communicating with the valve seat, and a portion of said plug valve having a duct formed therein communicating at one end with the valve port and having its opposite end opening onto the peripheral portion of said plug valve and adapted for registration, at times, with said elongated way.

In witness whereof I have hereunto set my hand.

PETER NACHTSHEIM.